April 14, 1959 F. E. NEWKIRK 2,881,550
LIVE BAIT HOLDER AND HOOK DEVICE
Filed Feb. 26, 1957
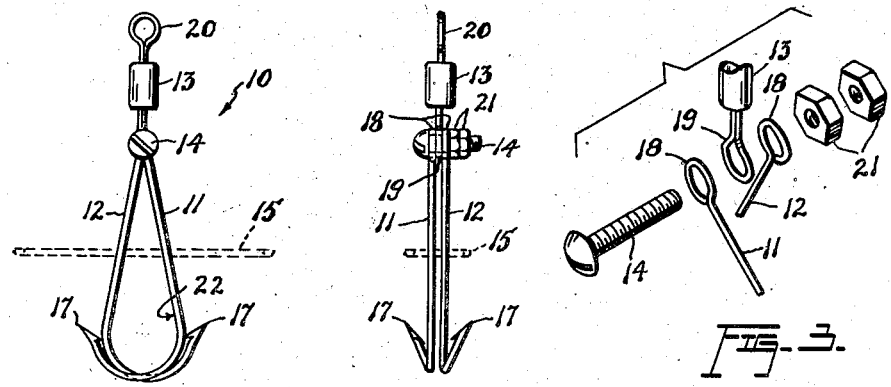
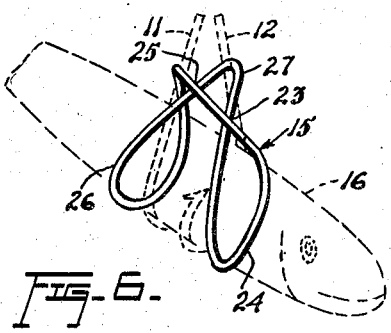
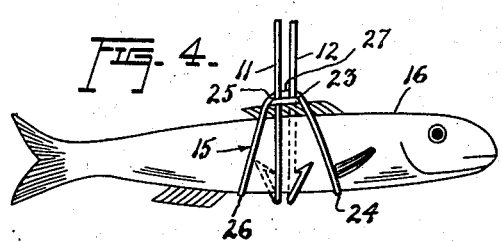
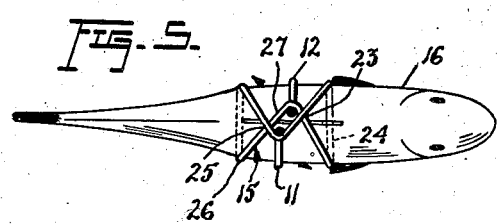
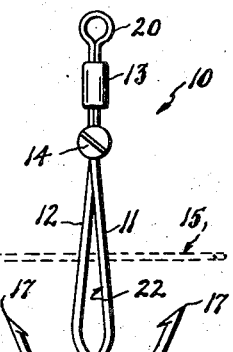
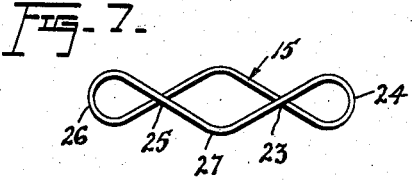
Inventor:
Frank E. Newkirk United States Patent Office 2,881,550
Patented Apr. 14, 1959

2,881,550

LIVE BAIT HOLDER AND HOOK DEVICE

Frank E. Newkirk, Pacific Grove, Calif., assignor of one-tenth to Gadget-Of-The-Month Club, Inc., Los Angeles, Calif., a corporation of California Application February 26, 1957, Serial No. 642,555

2 Claims. (Cl. 43—44.6)

This invention relates to new and useful improvements in fishing devices, and in particular the invention concerns itself with a combined live bait holder and hook assembly which may be effectively employed at the end of a fishing line for holding live bait as well as hooking a fish attracted thereby.

In accordance with conventional practice, live bait such as a minnow, frog, or the like, is placed directly on a conventional hook so that the latter is almost entirely embedded in and concealed by the bait. This arrangement possesses several disadvantages, mainly because the bait is injured by the hook and dies prematurely, thus losing its usefulness. Even while the bait is alive, its freedom of movement is hampered by the hook and its efficiency in attracting fish is correspondingly impaired. In addition, the hook embedded in the bait is not readily exposed when a fish bites and consequently many a catch is lost by the impaired ability of the hook to perform its intended function.

The principal object of the present invention, therefore, is to eliminate the above mentioned disadvantages by providing a device whereby live bait may be efficiently held without mutilation or injury by the hook, whereby movement of the bait is not impaired by the hook, and wherein the hook is exposed to effectively catch a fish when the latter bites.

The above object is attained by the provision of a combined live bait holder and hook assembly embodying, in effect, a pair of juxtaposed hooks which form a hoop-like bait receiving member between the bill portions thereof, the pointed extremities of the hooks being disposed exteriorly of the hoop-like member so as not to injure the bait in the latter.

Another important feature of the invention resides in the provision of novel keeper means cooperating with the hooks for sustaining the bait in the hoop-like member, so that the bait is securely held in place against possible loss, particularly during casting, or the like, yet permitting the bait to move with relative freedom to attract fish.

Another important feature of the invention resides in the provision of means for pivotally connecting the two hooks of the device together so that, when the bait in the hoop-like member is collapsed under pressure of the jaws of a biting fish, the hooks may move together and project their pointed extremities laterally outwardly to efficiently hook the jaws of the fish.

Some of the advantages of the invention reside in the simple arrangement of the bait retaining means permitting expeditious and convenient removal and replacement of the bait when needed; in a similarly simple connection of the hooks to each other and to a swivel coupling for attaching the entire device to a fishing line, whereby the various parts may be easily disassembled for purposes of cleaning or repair; and in the adaptability of the device for use with live bait of various types.

With the foregoing more important objects and features in view and such other objects and features as may become apparent as this specification proceeds, the invention will be understood from the following description taken in conjunction with the accompanying drawing, wherein like characters of reference are employed to designate like parts and wherein:

Figure 1 is a front elevational view of the invention showing the elastic band used therein by dotted lines;

Figure 2 is a side elevational view thereof;

Figure 3 is a fragmentary group perspective view illustrating the pivotal connection between the two hooks and the swivel coupling;

Figure 4 is a fragmentary elevational view of the device with live bait such as a minnow positioned therein;

Figure 5 is a top plan view of the subject shown in Figure 4;

Figure 6 is a perspective view of the elastic band in its operative position and in relation to the hooks and bait shown by dotted lines;

Figure 7 is a plan view of the band per se, diagrammatically showing the same crossed over itself to form three loops; and Figure 8 is an elevational view, similar to that shown in Figure 1 but illustrating the hooks with the pointed extremities thereof projected laterally outwardly.

Referring now to the accompanying drawing in detail, the combined live bait holder and hook device is designated generally by the reference numeral 10 and, broadly, embodies in its construction a pair of more-or-less conventional fish hooks 11, 12, a swivel coupling 13 of a conventional type for attaching the entire device to a fishing line (not shown), a pivot element 14 for connecting the hooks 11, 12 and the coupling 13 together, and an endless elastic band 15 for retaining live bait such as for example, a minnow 16 in position between the hooks.

The hooks 11, 12 are disposed in a juxtaposed relation with the pointed extremities 17 thereof facing in opposite directions and each hook is provided at its upper end with an eye 18 which is substantially coplanar with the hook. The eyes 18 of the two hooks are aligned with and located at opposite sides of an eye 19 at one end of the swivel coupling 13, while another eye 20 at the other end of the coupling serves to attach the entire device to a fishing line (not shown).

The aforementioned element 14, which is preferably in the form of a bolt, extends through the aligned eyes 18, 19 and serves to pivotally connect the two hooks together as well as to the coupling 13. The bolt 14 is equipped with a pair of lock nuts 21 to prevent the same from sliding out of the eyes 18, 19, yet permit the device to be easily disassembled for purposes of cleaning or repair, when desired.

As is best shown in Figure 1, the bill portions of the two hooks 11, 12 form therebetween a hoop-like or cradle-like member 22 to receive the live bait 16. However, it is to be noted that the pointed extremities 17 of the hooks, are disposed exteriorly of the member 22 so that they do not contact the bait. In this manner injury of the bait is prevented and the bait is held in a relatively free manner so that its movements are not impaired. The aforementioned elastic band 15 provides keeper means for sustaining the bait in the member 22, still without materially impairing its movement, but with assurance that the bait is not lost, especially during casting, or the like. The band 15 is shown only diagrammatically in Figures 1, 2 and 8, and the manner of applying the same to the bait and to the two hooks will be now explained. When the device is prepared for use, the band 15 is passed over the hooks 11, 12 substantially to the position shown in Figure 1 and the minnow 16 is inserted in the hoop-like or cradle-like member 22 formed by the bill portions of the hooks, so that it occupies the position shown in Figures 4 and 5. One end portion of the band 15 is then rotated through a half turn so that the band crosses itself at a point 23 and the adjacent end portion thereof forms a loop 24. This loop is then stretched and passed over one end of the minnow, as shown.

The same procedure is then repeated with the other end portion of the band 15 by rotating the same through a half turn so that it crosses itself at a point 25 and the adjacent end portion thereof forms a loop 26 which is stretched and passed over the other end of the minnow. The band loops 24, 26 are disposed at the opposite sides of the hoop-like member 22 and embrace the minnow in the manner shown, so as to firmly retain it in place. The end portions of the band forming the loops 24, 26 are rotated or twisted in relatively opposite directions whereby the intermediate portion of the band also forms a loop 27 which embraces the hooks 11, 12.

It will be apparent from the foregoing that although the minnow is firmly held in place, nevertheless it is relatively free to move in order to attract fish. Moreover, the minnow is sustained out of contact with the pointed extremities 17 of the hooks and, therefore, is not injured thereby, so that it does not die prematurely.

The procedure of placing the minnow in the device and applying the elastic band thereto as above described is preferably performed while holding the device in an inverted position, so that the band may be easily manipulated.

When the invention is placed in use and a fish bites, the pressure of the jaws of the fish will cause the minnow to collapse, with the result that the hooks 11, 12 will be free to move toward each other and the pointed extremities 17 thereof will be projected laterally outwardly to the positions shown in Figure 8, wherein they may readily embed themselves in the mouth of the fish. Thus, the arrangement of the invention not only sustains the minnow out of contact with the pointed extremities of the hooks, but also locates such extremities in an external, exposed position where they are readily available to perform the function for which they are intended.

It will be understood that the invention may be used, apart from minnows, with live bait of various types such as frogs, eels, or the like. Moreover, the invention may be manufactured in various sizes and, if made sufficiently small, may be also used with live bait such as worms.

Thus, while in the foregoing there has been disclosed the preferred embodiment of the invention, various modifications may become apparent to those skilled in the art to which the invention relates. Accordingly, it is not desired to limit the invention to this disclosure, and various modifications may be resorted to, such as may fall within the spirit and scope of the appended claims.

What is claimed as new is:

1. A live bait holder and hook device, comprising a pair of juxtaposed fish hooks each having a bill portion and a curved hook portion at one end thereof provided with a pointed extremity, each of said curved hook portions having an effectively concave interior, said bill portions being initially divergingly relatively inclined and spaced with respect to each other adjacent said hook portions with said concave interiors of said hook portions being spaced apart and facing each other and effectively forming hoop-like means between said bill portions, said pointed extremities being oppositely directed and positioned exteriorly of said hoop-like means, means pivotally connecting the other ends of said bill portions about an axis substantially transverse to said hoop-like means for movement toward each other whereby said pointed extremities may be projected laterally outwardly, said hoop-like member being adapted to receive live bait therein, and an endless elastic band crossed over itself at two points to form an intermediate loop embracing the exteriors of each of said bill portions on each side of the space between said bill portions and to form a pair of end loops adapted to elastically embrace said bait at opposite sides of said hoop-like means for sustaining said bait in said hoop-like means.

2. The combination of a pair of juxtaposed fish hooks each having a bill portion and a curved hook portion at the bottom thereof provided with a pointed extremity, each of said curved hook portions having a concave interior, said bill portions being initially downwardly divergingly relatively inclined and spaced with respect to each other adjacent said hook portions with said concave interiors of said hook portions being spaced apart and directed toward each other and, together with said spaced bill portions, forming hoop-like means therebetween, said pointed extremities being oppositely directed and positioned exteriorly of said hoop-like means, live bait positioned in said hoop-like means, means pivotally connecting the upper ends of said bill portions about an axis substantially perpendicular to the plane of said hoop-like means for movement of said hooks from an initial position toward each other whereby said pointed extremities may be projected laterally outwardly upon collapsing of said bait in said hoop-like means, an endless elastic band crossed over itself at two points to form an intermediate loop elastically embracing the exteriors of each of said bill portions on each side of the space between said bill portions and to form a pair of end loops elastically embracing said bait at opposite sides of said hoop-like means, said bait being elastically sustained in said hoop-like means solely by said elastic band inwardly constricting same, and a swivel coupling attached with respect to the upper ends of said bill portions at the point of pivotal connection thereof and adapted for attaching the same to a fishing line.

References Cited in the file of this patent

UNITED STATES PATENTS

| | | |
|---|---|---|
| 622,206 | Claflin | Apr. 4, 1899 |
| 768,451 | Hedlund | Aug. 23, 1904 |
| 2,051,651 | Pachner et al. | Aug. 18, 1936 |
| 2,791,861 | Beck | May 14, 1957 |